United States Patent
Castinado et al.

(10) Patent No.: US 10,270,594 B2
(45) Date of Patent: Apr. 23, 2019

(54) ENHANCED POLYMORPHIC QUANTUM ENABLED FIREWALL

(71) Applicant: BANK OF AMERICA CORPORATION, Charlotte, NC (US)

(72) Inventors: Joseph Benjamin Castinado, North Glenn, CO (US); Jeffery B. Schroeder, Indian Trail, NC (US); William August Stahlhut, The Colony, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 222 days.

(21) Appl. No.: 15/450,617

(22) Filed: Mar. 6, 2017

(65) Prior Publication Data

US 2018/0254895 A1 Sep. 6, 2018

(51) Int. Cl.
*H04L 9/14* (2006.01)
*H04L 9/08* (2006.01)
(Continued)

(52) U.S. Cl.
CPC .......... *H04L 9/0852* (2013.01); *H04L 9/0861* (2013.01); *H04L 9/14* (2013.01);
(Continued)

(58) Field of Classification Search
CPC ..... H04L 9/0852; H04L 63/1408; H04L 9/14; H04L 9/0861; H04L 2209/80; H04L 63/0209; H04W 12/04
See application file for complete search history.

(56) References Cited

U.S. PATENT DOCUMENTS 6,965,992 B1 * 11/2005 Joseph ................ H04L 63/0428
380/281
7,135,701 B2   11/2006 Amin et al.
(Continued)

FOREIGN PATENT DOCUMENTS

AU    2010249233 A1    6/2011
CA       2886849 A1   10/2016
(Continued)

OTHER PUBLICATIONS

R. D. Sharma and A. De, "A new secure model for quantum key distribution protocol," 2011 6th International Conference on Industrial and Information Systems, Kandy, 2011, pp. 462-466.*

*Primary Examiner* — Farid Homayounmehr
*Assistant Examiner* — Zhimei Zhu
(74) *Attorney, Agent, or Firm* — Michael A. Springs; Morre & Van Allen PLLC; Nicholas C. Russell

(57) ABSTRACT

A system for generating an enhanced polymorphic quantum enabled firewall in real-time typically includes a classical computer apparatus and a quantum optimizer in communication with the classical computer apparatus. The classical computer apparatus is configured to identify an unauthorized attempt to access information by an unidentified source, collect a first set of data about the unauthorized attempt, determine a type of the unauthorized attempt by analyzing the first set of data, and transmit the first set of data and the type of the unauthorized attempt to the quantum optimizer. The quantum optimizer upon receiving the first set of data and the type of the unauthorized attempt, generates a second key and a second level of encryption using the second key, generates a new protocol for transferring the second level of encryption over a network, and transfers the second level of encryption and the new protocol to the classical computer apparatus.

20 Claims, 7 Drawing Sheets

(51) Int. Cl.
*H04W 12/04* (2009.01)
*H04L 29/06* (2006.01)

(52) U.S. Cl.
CPC ......... *H04L 63/1408* (2013.01); *H04W 12/04* (2013.01); *H04L 63/0209* (2013.01); *H04L 2209/80* (2013.01)

(56) References Cited

U.S. PATENT DOCUMENTS

| | | | |
|---|---|---|---|
| 7,418,283 | B2 | 8/2008 | Amin |
| 7,533,068 | B2 | 5/2009 | van den Brink et al. |
| 7,619,437 | B2 | 11/2009 | Thom et al. |
| 7,639,035 | B2 | 12/2009 | Berkley |
| 7,898,282 | B2 | 3/2011 | Harris et al. |
| 8,008,942 | B2 | 8/2011 | van den Brink et al. |
| 8,190,548 | B2 | 5/2012 | Choi |
| 8,195,596 | B2 | 6/2012 | Rose et al. |
| 8,283,943 | B2 | 10/2012 | van den Brink et al. |
| 8,421,053 | B2 | 4/2013 | Bunyk et al. |
| 8,744,075 | B2 | 6/2014 | Tanaka |
| 8,897,449 | B1* | 11/2014 | Broadbent ............ H04L 9/0891 380/277 |
| 9,207,672 | B2 | 12/2015 | Williams et al. |
| 9,246,675 | B2 | 1/2016 | Ding |
| 9,400,499 | B2 | 7/2016 | Williams et al. |
| 9,413,783 | B1* | 8/2016 | Keogh ................ H04L 63/1458 |
| 9,537,660 | B2 | 1/2017 | Wang et al. |
| 2003/0044012 | A1* | 3/2003 | Eden ........................ H04N 1/44 380/243 |
| 2004/0139000 | A1 | 7/2004 | Amos |
| 2005/0010508 | A1 | 1/2005 | Groz |
| 2005/0240689 | A1* | 10/2005 | Leaming ............... G06F 13/385 710/52 |
| 2006/0088157 | A1 | 4/2006 | Fujii |
| 2006/0251247 | A1 | 11/2006 | Akiyama et al. |
| 2006/0288413 | A1* | 12/2006 | Kubota ................... G06F 21/55 726/23 |
| 2008/0086554 | A1* | 4/2008 | Royalty ............. H04L 63/1408 709/224 |
| 2011/0055585 | A1* | 3/2011 | Lee ....................... H04L 9/0844 713/183 |
| 2012/0002008 | A1 | 1/2012 | Valin et al. |
| 2013/0117200 | A1 | 5/2013 | Thom |
| 2014/0068765 | A1* | 3/2014 | Choi ..................... H04L 9/0852 726/23 |
| 2014/0214257 | A1* | 7/2014 | Williams ................ G05D 1/00 701/25 |
| 2017/0177534 | A1* | 6/2017 | Mohseni ............. H03K 19/195 |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | 2010105993 A2 | 9/2010 |
| WO | 2015149035 A1 | 10/2015 |

* cited by examiner

ENHANCED POLYMORPHIC QUANTUM ENABLED FIREWALL

FIELD OF THE INVENTION

The present invention relates to utilizing a quantum optimizer to generate an enhanced polymorphic quantum enabled firewall.

BACKGROUND

It is often difficult to manage transfer of information over a network. As such, a need exists for an improved way of transferring information securely.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, computer program product and/or other devices) and methods for generating a polymorphic quantum enabled firewall in real-time.

In one aspect, the present invention embraces a computerized system, and an associated method and computer program product for generating a polymorphic quantum enabled firewall in real-time. The system includes a processor, a memory, and a network communication device. In one embodiment, the system comprises a classical computer apparatus comprising: a processor; a memory; and a crypto-security application that is stored in the memory and executable by the processor; a quantum optimizer in communication with the classical computer apparatus, the quantum optimizer comprising: a quantum processor; and a quantum memory; wherein the crypto-security application is configured for: identifying an unauthorized attempt to access information by an unidentified source; collecting a first set of data about the unauthorized attempt in response to identifying the unauthorized attempt to access the information; determining a type of the unauthorized attempt by analyzing the first set of data, wherein the type of the unauthorized attempt is based on a level of severity of the unauthorized attempt; transmitting the first set of data and the type of the unauthorized attempt to the quantum optimizer; receiving from the quantum optimizer a second level of encryption and a new protocol; and monitoring the unauthorized attempt to detect an event associated with the unauthorized attempt; wherein the quantum optimizer is configured for: receiving the first set of data and the type of the unauthorized attempt from the crypto-security application; modifying a quantum crypto-algorithm to: generate a second key based on the first set of data and the type of the unauthorized attempt; generate the second level of encryption using the second key, wherein the second level of encryption is more robust than the first level of encryption; generating the new protocol for transferring the second level of encryption over a network; and transferring the second level of encryption and the new protocol to the crypto-security application.

In some embodiments, the unauthorized attempt is an attempt to bypass a first level of encryption.

In some embodiments, the crypto-security application is configured for: identifying the event based on monitoring the unauthorized attempt, wherein the event is an information breach; collecting a second set of data associated with the event in response to identifying the event; transmitting the second set of data associated with the event to the quantum optimizer and receiving a third level of encryption from the quantum optimizer.

In some embodiments, receiving the second set of data associated with the event from the crypto-security application; modifying the quantum crypto-algorithm to: generate a third key based on the second set of data; generate the third level of encryption using the third key; and transferring the third level of encryption to the crypto-security application.

In some embodiments, the crypto-security application is configured for monitoring the unauthorized attempt to detect continuing unauthorized attempt by the unidentified source after a defined amount of time; updating the first set of data and transmit the first set of data to the quantum optimizer; and receiving the new second level of encryption from the quantum optimizer.

In some embodiments, the quantum optimizer is configured for generating a new second key based on receiving the updated first set of data from the crypto-security application; generating a new second level of encryption using the new second key, wherein the new second level of encryption replaces the second level of encryption; and transmitting the new second level of encryption to the crypto-security application.

In some embodiments, the quantum optimizer is configured for generating the new second key by modifying the second key.

BRIEF DESCRIPTION OF THE DRAWINGS

Figure 1:
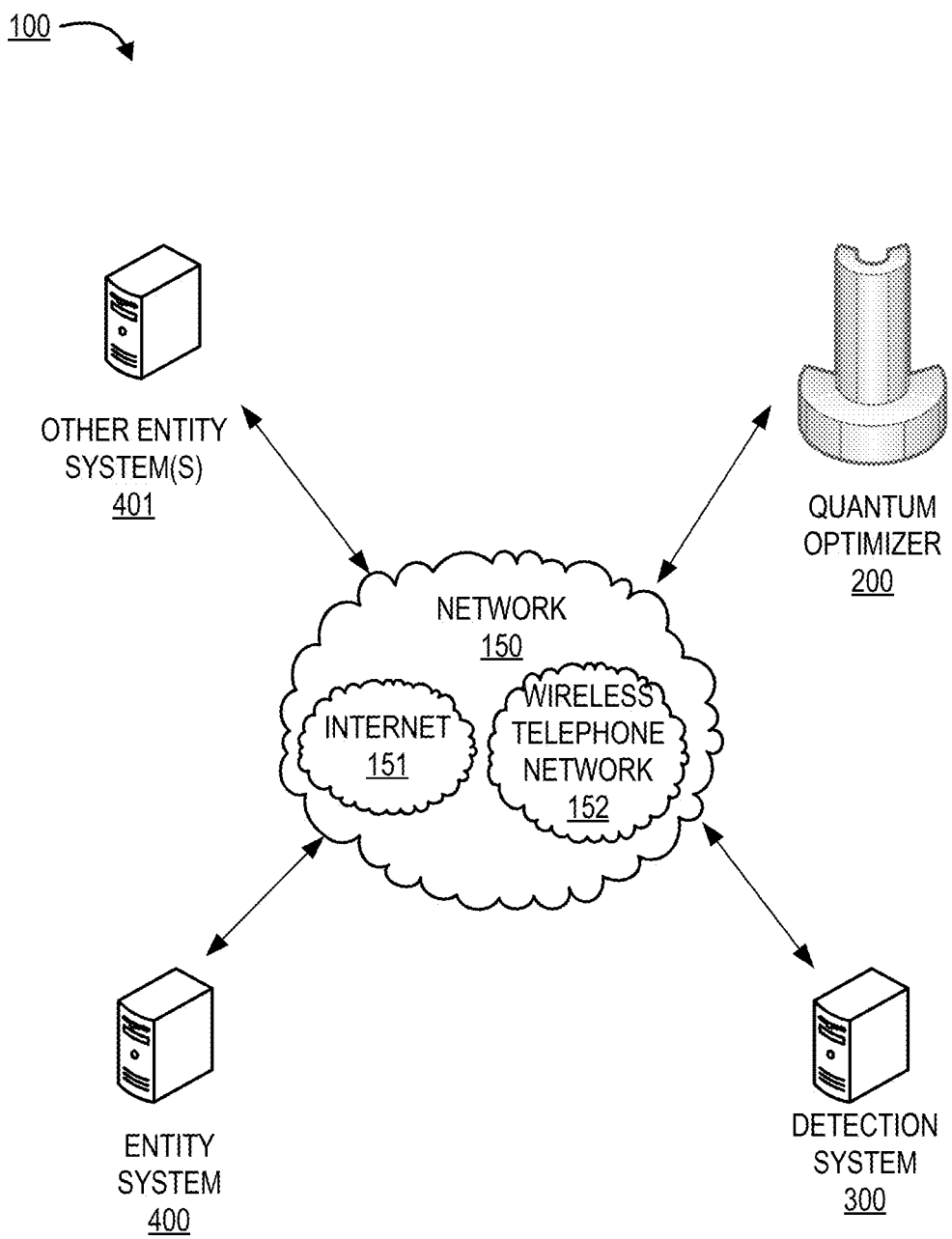
Figure 2:
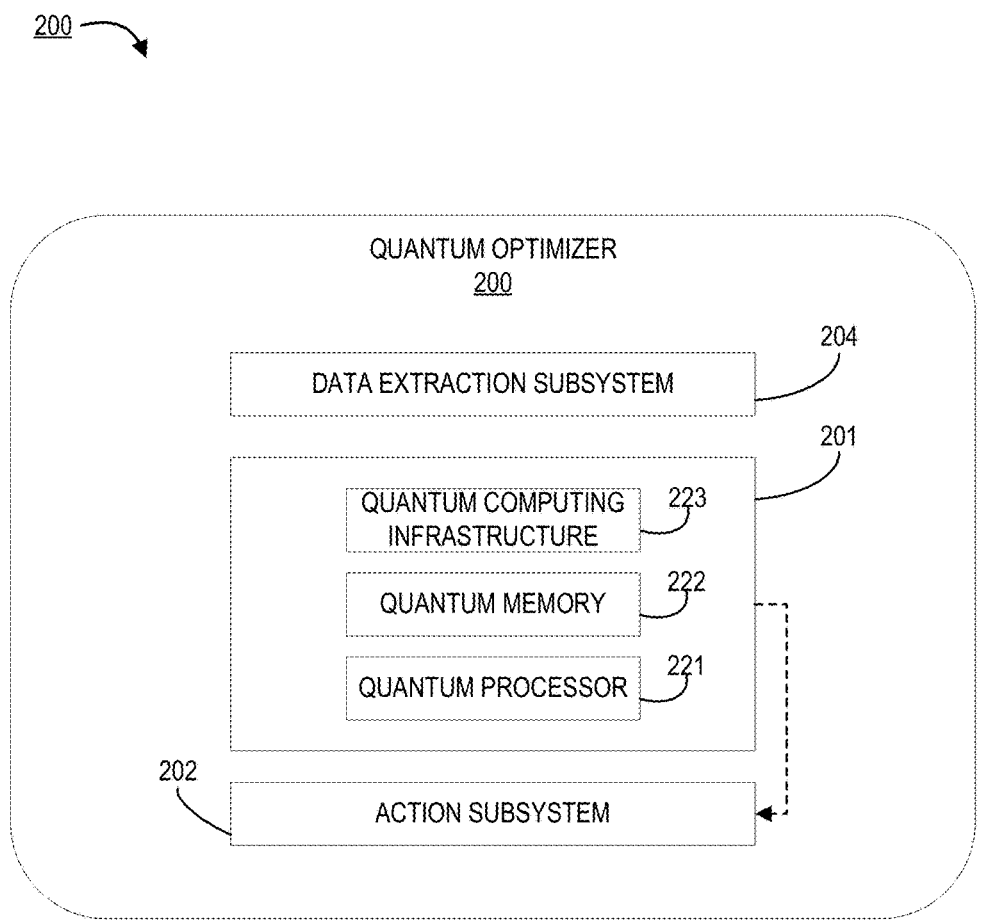
Figure 3:
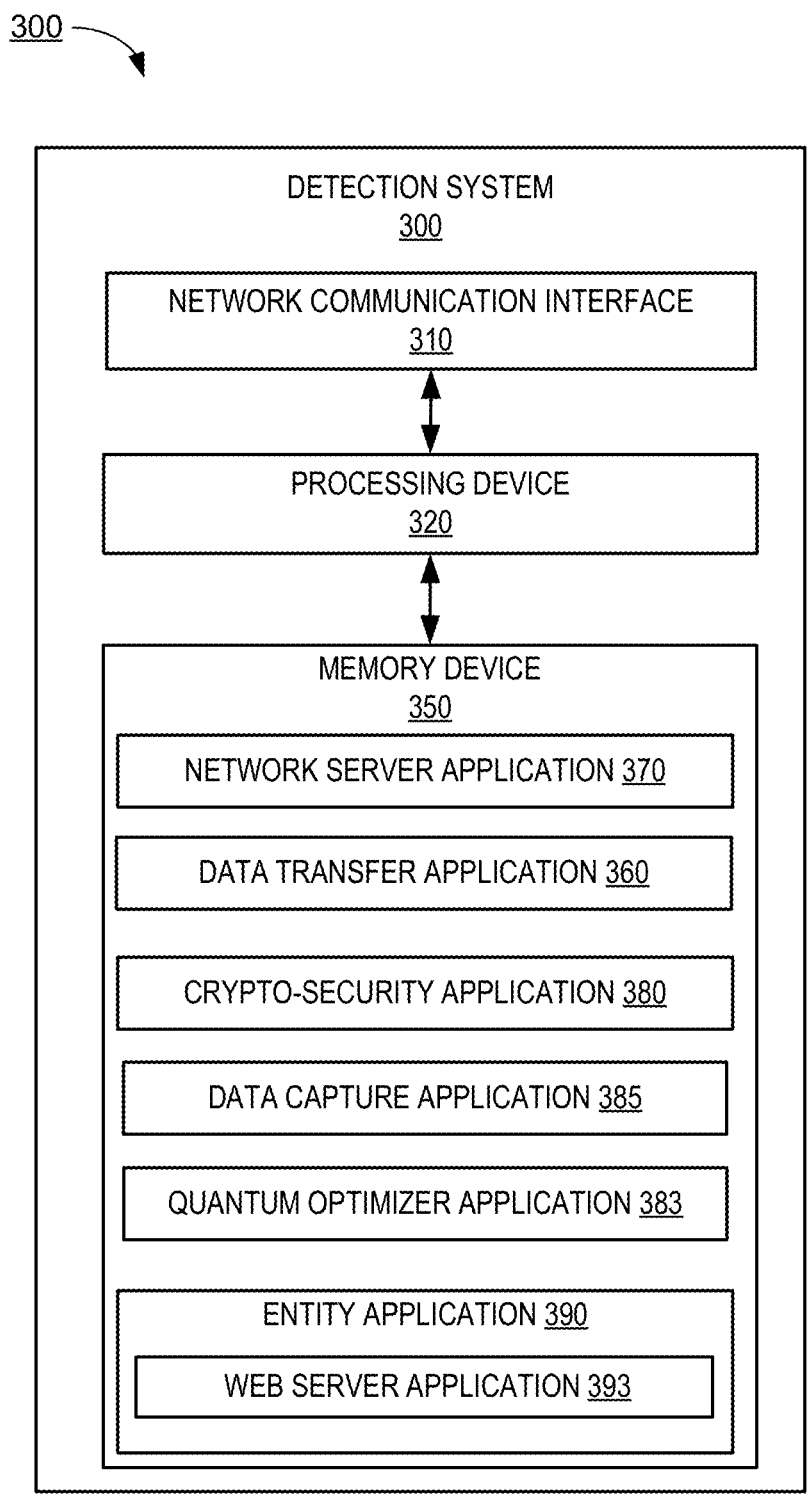
Figure 4:
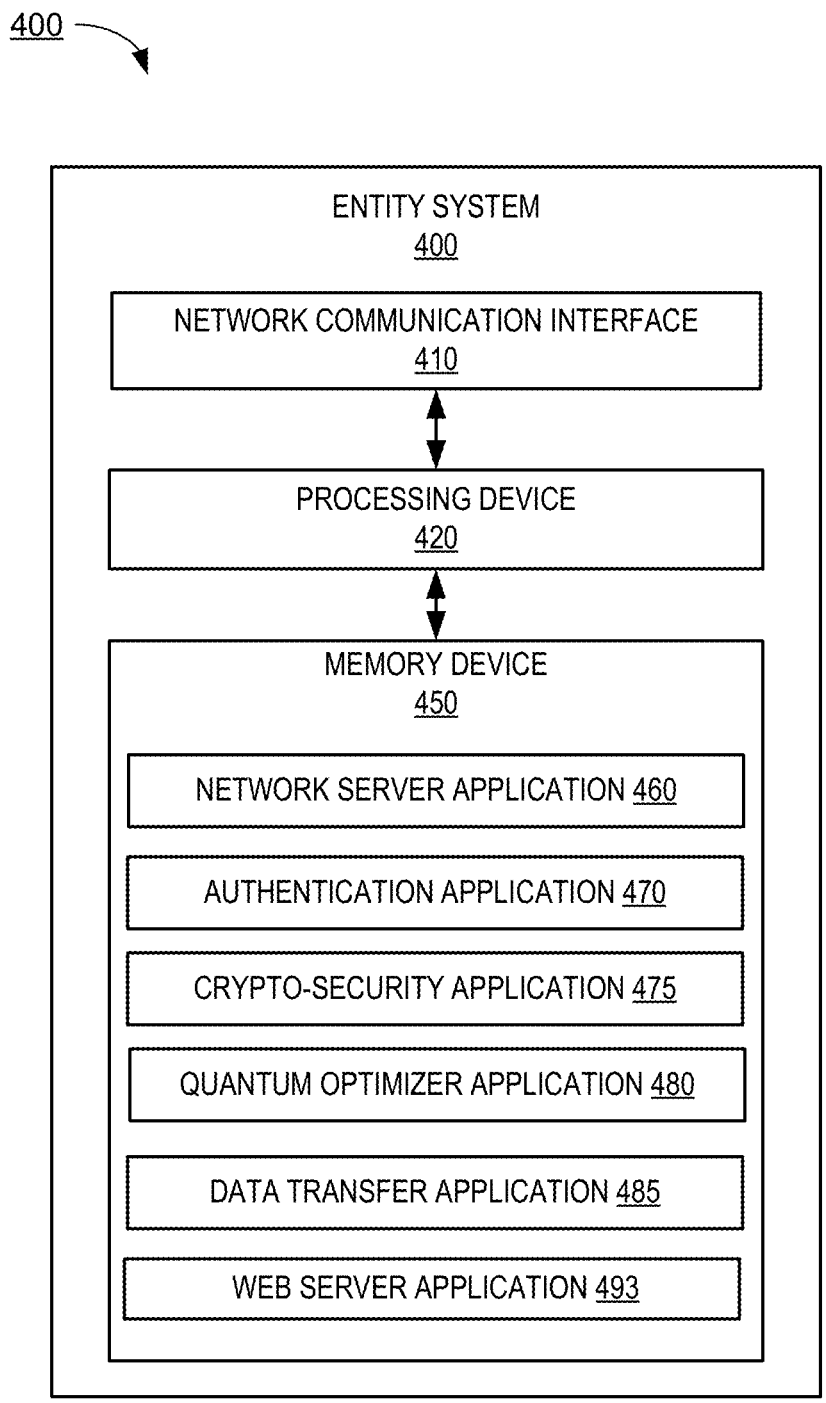
Figure 5:
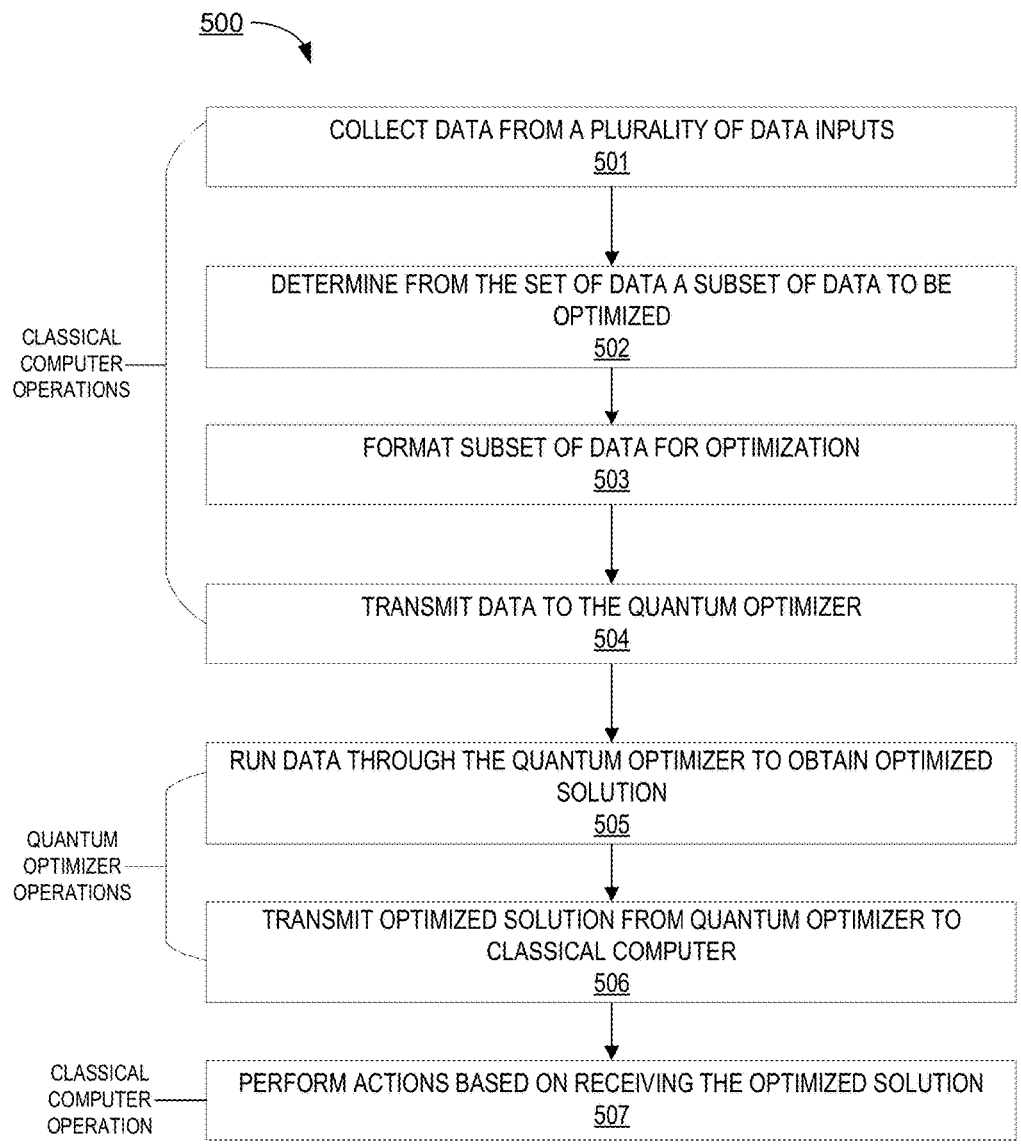
Figure 6:
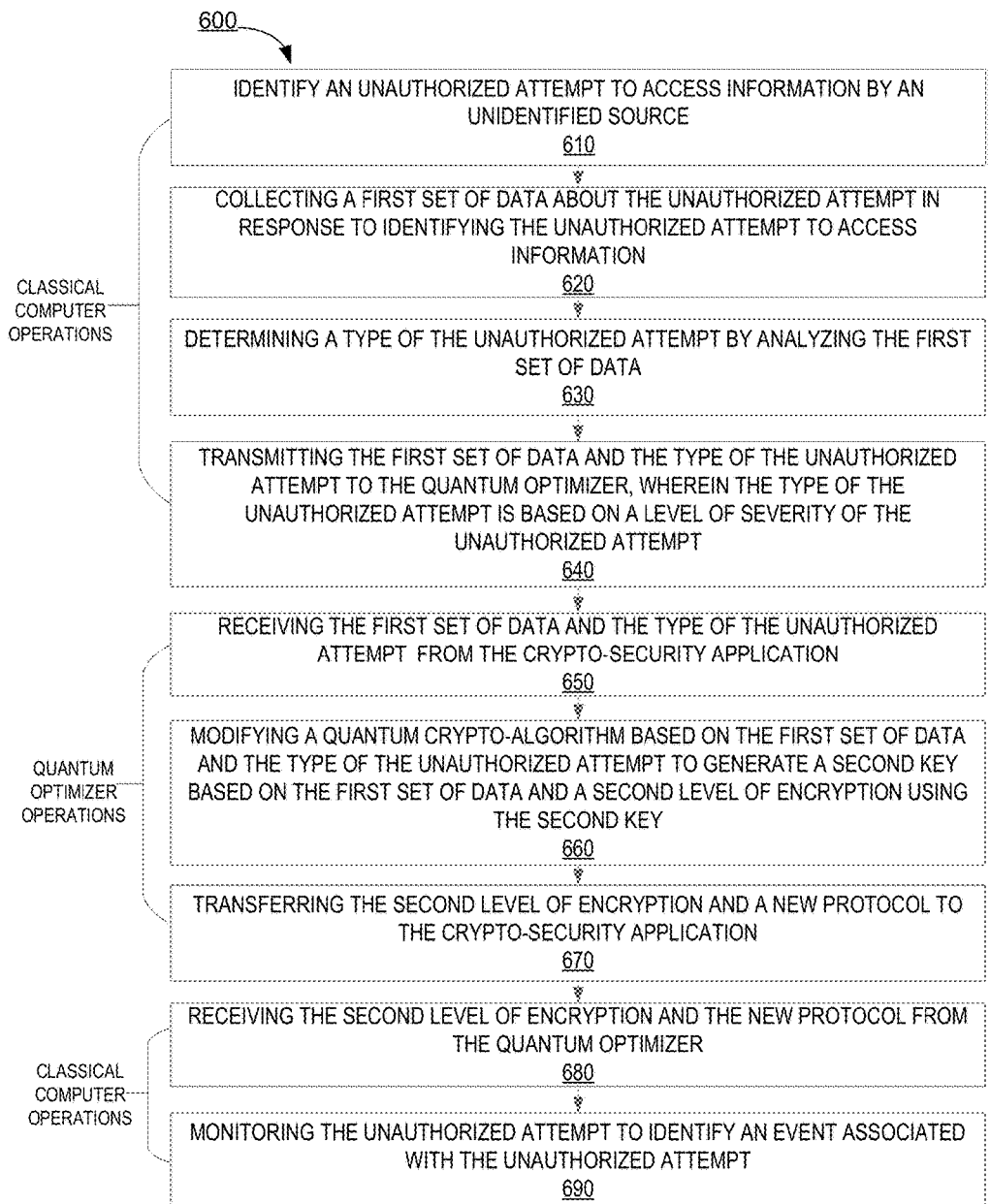
Figure 7:
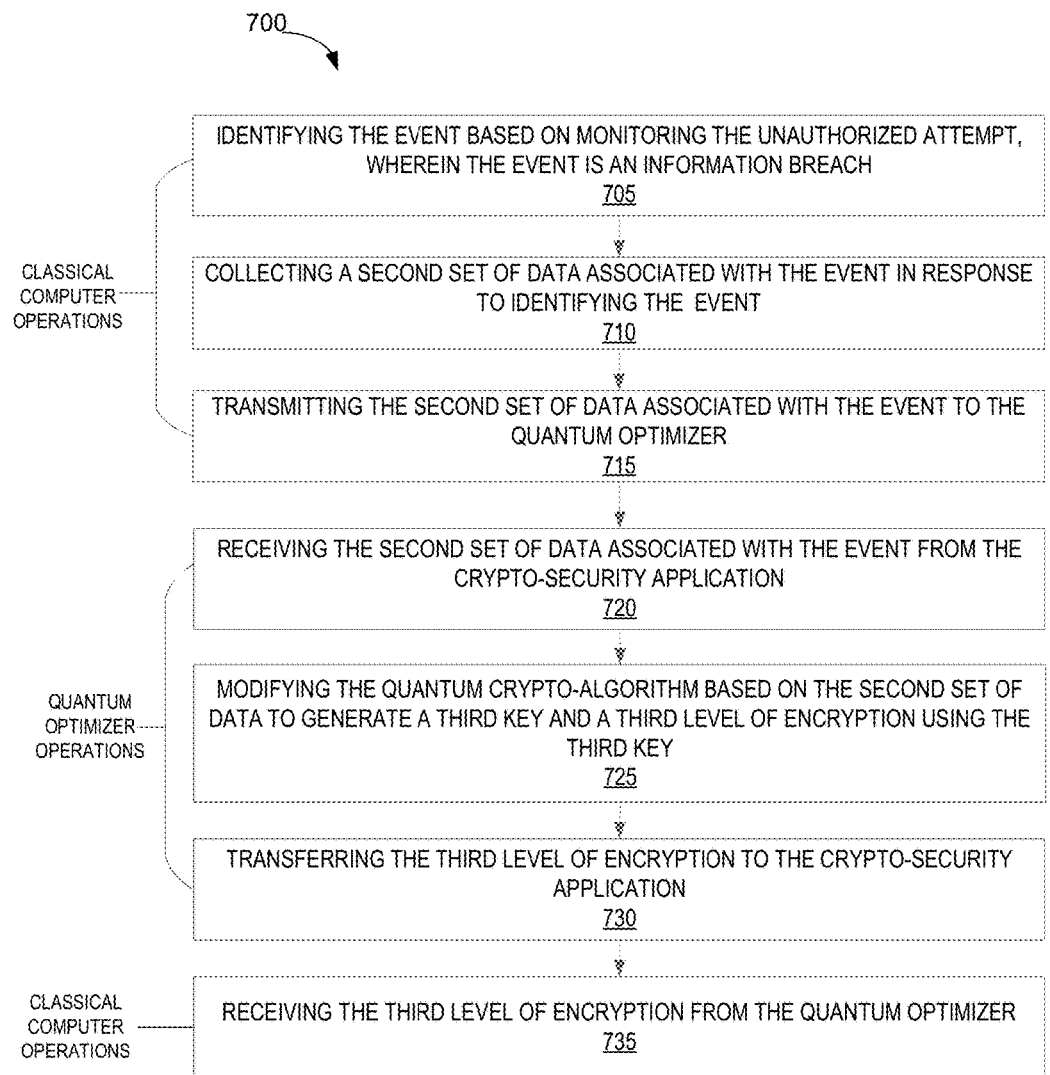

Having thus described some embodiments of the present invention in general terms, reference will now be made to the accompanying drawings, where:

FIG. 1 presents a technical components of a system for generating an enhanced polymorphic quantum enabled firewall, in accordance with an embodiment of the present invention;

FIG. 2 presents a block diagram illustrating the quantum optimizer of FIG. 1, in accordance with embodiments of the present invention;

FIG. 3 presents block diagram illustrating the detection system of FIG. 1, in accordance with embodiments of the present invention;

FIG. 4 presents a block diagram illustrating the entity system(s) of FIG. 1, in accordance with embodiments of the present invention;

FIG. 5 presents a process flow illustrating the utilization of the quantum optimizer of FIG. 1, in accordance with embodiments of the present invention;

FIG. 6 presents a process flow illustrating the generation of polymorphic quantum enabled firewall upon detecting an unauthorized attempt, in accordance with embodiments of the present invention; and FIG. 7 presents a process flow illustrating the generation of polymorphic quantum enabled firewall upon identifying an event, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. No. 9,400,499, U.S. Pat. No. 9,207,672, each of which is incorporated herein by reference in its entirety.

In accordance with embodiments of the invention, the terms "entity" and "third party system" may include any organization that processes financial transactions including, but not limited to, banks, credit unions, savings and loan associations, investment companies, stock brokerages, asset management firms, insurance companies and the like. In accordance with embodiments of the invention, the terms "third party system" and "other third party systems" may include any organizations including, but not limited to, photo identification issuing agencies, network managing organizations, email managing organizations, and/or the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

In accordance with embodiments of the invention, an "account" or a "record" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity. In accordance with embodiments of the present invention, an "encryption" may be a process of encoding information in such a way that only authorized parties can access it.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Many of the embodiments and example embodiments thereof described herein are directed towards solving a problem of protecting the incoming and outgoing information in an entity. Information breach may involve losing confidential information. The present invention provides a dynamic generation of keys for encrypting the information based on identifying unauthorized attempts to access information and level of severity of the attempts. The system and method described herein use quantum optimizer to generate a higher and stronger level of keys quickly and efficiently by adapting to the type of threats identified in real-time.

FIG. 1 provides a block diagram illustrating an environment 100 for generating a polymorphic quantum enabled firewall. As depicted in FIG. 1, the operating environment 100 typically includes a detection system 300 interacting with an entity system 400, a quantum optimizer 200, other entity systems 401, using a network 150. In some embodiments, the detection system 300 may be maintained by the entity. In some embodiments, the detection system 300 may be owned by the entity and maintained by a third party. In some embodiments, the detection system 300 may be a part of the entity system 400. In some embodiments, the system environment may include other third party systems and other entity systems. As further illustrated in FIG. 1, an exemplary quantum optimizer 200 that can be used in parallel with the detection system 300 to solve optimization problems is presented. In this regard, the detection system 300 may be used to perform classical digital processing tasks described in the present systems and methods.

The network 150 may be a system specific distributive network receiving and distributing specific network feeds and identifying specific network associated triggers. The network 150 may also be a global area network (GAN), such as Internet 151, a wide area network (WAN), a local area network (LAN), or any other type of network or combination of networks. The network 150 may provide for wireline, wireless, or a combination wireline and wireless communication between devices on the network 150. The network 150 may be a wireless telephone network 152.

FIG. 2 is a schematic diagram of an exemplary Quantum Optimizer 200 that can be used in parallel with a classical computer to solve optimization problems. The Quantum Optimizer 200 is comprised of a Data Extraction Subsystem 204, a Quantum Computing Subsystem 201, and an Action Subsystem 205. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2, the Data Extraction Subsystem 204 communicates with the detection system 300 to extract data for optimization. It will be understood that any method of communication between the Data Extraction Subsystem 204 and the network is sufficient, including but not limited to wired communication, Radiofrequency (RF) communication, Bluetooth®, WiFi, and the like. The Data Extraction Subsystem 204 then formats the data for optimization in the Quantum Computing Subsystem.

As further depicted in FIG. 2, the Quantum Computing Subsystem 201 comprises a Quantum Computing Infrastructure 223, a Quantum Memory 222, and a Quantum Processor 221. The Quantum Computing Infrastructure 223 comprises physical components for housing the Quantum Processor 221 and the Quantum Memory 222. The Quantum Computer Infrastructure 223 further comprises a cryogenic refrigeration system to keep the Quantum Computing Subsystem 201 at the desired operating temperatures. In general, the Quantum Processor 221 is designed to perform adiabatic quantum computation and/or quantum annealing to optimize data received from the Data Extraction Subsystem 204. The Quantum Memory 222 is comprised of a plurality of qubits used for storing data during operation of the Quantum Computing Subsystem 201. In general, qubits are any two-state quantum mechanical system. It will be understood that the Quantum Memory 222 may be comprised of any such two-state quantum mechanical system, such as the polarization of a single photon, the spin of an electron, and the like.

The Action Subsystem 202 communicates the optimized data from the Quantum Computing Subsystem 201 back to the detection system. It will be understood that any method of communication between the Data Extraction Subsystem 204 and the network is sufficient, including but not limited to wired communication, Radiofrequency (RF) communication, Bluetooth®, WiFi, and the like.

In accordance with the present systems and methods, an on-board quantum optimizer may be employed to perform real-time optimizations to generate strong cryptographic keys more quickly and more reliably than a digital computing system. Because a quantum computing device inherently performs optimization in its natural evolution, quantum optimizer is particularly well-suited to solve optimization problems.

FIG. 3 presents a block diagram illustrating the detection system 300, in accordance with embodiments of the invention. The detection system 300 includes one or more processing devices 320 operatively coupled to a network communication interface 310 and a memory device 350. In certain embodiments, the detection system 300 is operated by an entity, such as a financial institution. The detection system 300 is configured to perform classical computer operations described in process flows of the present invention.

It should be understood that the memory device 350 may include one or more databases or other data structures/repositories. The memory device 350 also includes computer-executable program code that instructs the processing device 320 to operate the network communication interface 310 to perform certain communication functions of the detection system 300 described herein. In one embodiment of the detection system 300, the memory device 350 includes, but is not limited to, a network server application 370, a data transfer application 360, a crypto-security application 380, data capture application 385, quantum optimizer application 383, and an entity application 390 including a web server application 393, and other computer-executable instructions or other data. The computer-executable program code of the network server application 370, the data transfer application 360, the crypto-security application 380, data capture application 385, quantum optimizer application 383, entity application, or the web server application 393 may instruct the processing device 320 to perform certain logic, data-processing, and data-storing functions of the detection system 300 described herein, as well as communication functions of the detection system 300.

In some embodiments, the quantum optimizer application 383 allows communication with the quantum optimizer 200 using the network communication interface 310. The data capture application 385 allows the capture of data associated with events and other unauthorized attempts discussed in the present invention. The data transfer application 360 facilitates the transfer of the captured data from the detection system 300 to other systems on the network 150 and from the other system on the network 150 to the detection system 300. The crypto-security application 380 is provided by the detection system 300 for performing steps associated with process flows described in the present invention. The crypto-security application 380 may include security mechanisms comprising functionalities of intrusion detection, network traffic listening, and/or the like.

As used herein, a "communication interface" generally includes a modem, server, transceiver, and/or other device for communicating with other devices on a network. The network communication interface 310 is a communication interface having one or more communication devices configured to communicate with one or more other devices on the network 150, such the quantum optimizer 200, entity system 400 and other entity systems 401. The processing device 320 is configured to use the network communication interface 310 to transmit and/or receive data and/or commands to and/or from the other devices connected to the network 150.

FIG. 4 provides a block diagram illustrating the entity system 400, in greater detail, in accordance with embodiments of the invention. As illustrated in FIG. 4, in one embodiment of the invention, the entity system 400 includes one or more processing devices 420 operatively coupled to a network communication interface 410 and a memory device 450. In certain embodiments, the entity system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the entity system 400 described herein. In one embodiment of the entity system 400, the memory device 450 includes, but is not limited to, a network server application 460, an authentication application 470, a crypto-security application 475, a quantum optimizer application 480, a data transfer application 485, and a web server application 493, and other computer-executable instructions or other data. The computer-executable program code of the network server application 460, the authentication application 470, the crypto-security application 475, the quantum optimizer application 480, the data transfer application 485, or the web server application 493 may instruct the processing device 420 to perform certain logic, data-processing, and data-storing functions of the entity system 400 described herein, as well as communication functions of the entity system 400. The crypto-security application 475 may be used by the entity system 400 to communicate with the detection system 300. The data capture application 385 may be used by the detection system 300 to capture data associated with the process flows described in the present invention.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the detection system 300, quantum optimizer 200, and/or the other entity systems 401. The processing device 420 is configured to use the network communication interface 410 to transmit and/or receive data and/or commands to and/or from the other devices connected to the network 150.

FIG. 5 is a high level process flow of an embodiment of the present invention. FIG. 5 illustrates the interaction between a classical computer and the quantum optimizer 200 to solve an optimization problem. As depicted in FIG. 5, a classical computer begins the process flow 500 at step 501 by collecting data from a plurality of inputs. At step 502, the classical computer then determines from the set of data collected at step 501 a subset a data to be optimized. The classical computer then formats the subset of data for optimization at step 503. At step 504, the classical computer transmits the formatted subset of data to the Quantum Optimizer 200. The Quantum Optimizer 200 runs the data to obtain the optimized solution at 505. The Quantum Optimizer 200 then transmits the optimized data back to the classical computer at step 506. Finally, the classical computer can perform actions based on receiving the optimized solution at step 507.

FIG. 6 presents a high level process flow 600 for generating an enhanced polymorphic quantum enabled firewall upon detecting an unauthorized attempt. As depicted in block 610 of FIG. 6, the detection system 300 comprising the crypto-security application 380, identifies an unauthorized attempt to access information by an unidentified source. The unidentified source may be an unauthorized user or an unauthorized system. The unauthorized system may be a classical computer or a quantum computer. Information may be defined as any secure data such as credit card numbers, entity financial information, account numbers, customer personal information, and/or the like. In some embodiments, information is typically transferred between multiple systems within the entity system on a daily basis over the network. In some embodiments, information may be stored in an account or a system. In some embodiments, information may be transferred between multiple accounts. In some other embodiments, the information may be transferred from a customer user device to the entity system over the network. The information transferred between one or more systems is in an encrypted format forming a first level of encryption. In some embodiments, the first level of encryption may be created at least by the entity system 400 or the detection system 300. The first level of encryption may be a hash, symmetric encryption, and/or asymmetric encryption created using any of the available crypto-algorithms. The crypto-algorithm used for creating the first layer of encryption may be any type of encryption algorithm such as a hash, symmetric encryption algorithms (secret key cryptography), and/or asymmetric encryption algorithms (public key cryptography). Some examples of symmetric encryption algorithms are Advanced Encryption Standard (AES), Data Encryption Standard (DES), Triple Data Encryption Algorithm, BLOWFISH, TWOFISH. Some examples of asymmetric algorithms are RSA, Diffle-Hellman, ECDSA, XTR. In some embodiments, the first level of encryption may be a combination of symmetric and asymmetric encryption such as SSL encryption and/or the like. In one embodiment, the unauthorized attempt may be any attempt to bypass the first level of encryption to access the information. Bypassing the first level of encryption to access the information may be detection of one or more keys used to encrypt and decrypt the information and identifying a protocol used to transfer the encrypted information. The unauthorized attempt may be an attempt to identify a protocol and/or detect one or more keys. The one or more keys may be private keys and/or public keys. In an exemplary embodiment, the unauthorized attempt may be a brute-force attack.

As shown in block 620, the detection system 300 collects a first set of data about the unauthorized attempt to access the information. The first set of data may be related to the nature of unauthorized attack. The first set of data may include but not limited, date and time stamp, IP address of the unidentified source, or any data associated with the nature of the unauthorized attack. As shown in block 630, the system 300 identifies a type of the unauthorized attempt by analyzing the first set of data, wherein the type of the unauthorized attempt is based on a level of severity of the unauthorized attempt. For example, based on the nature of the unauthorized attempt and type of the information involved when the unauthorized attempt is detected, the system 300 classifies the unauthorized attempt into type 1, type 2, type 3, . . . type N, wherein type 1 has the highest level of severity and type N has the lowest level of severity. In some embodiments, the number of levels of severity is set by the detection system 300. In some other embodiments, the number of levels of severity is set by the entity system. As shown in block 640, the system 300 transmits the first set of data and the type of the unauthorized attempt to the quantum optimizer 200. In some embodiments, the first set of data may include data associated with the first level of encryption. In some embodiments, the first set of data may include first level encrypted data. In some embodiments, the first set of data may include the information that requires encryption. In some embodiments, the first set of data may include location address of the information, wherein the quantum optimizer 200 may use the location address to extract the information that requires encryption. For example, a set of information is stored in the entity system, the first set of data includes the location address associated with the set of information that requires encryption before transferring the set of information to another entity system over a network. The quantum optimizer 200 initiates execution of a quantum optimization algorithm to determine one or more stronger keys to encrypt the information.

As shown in block 650, the quantum optimizer 200 receives the first set of data and the type of the unauthorized attempt from the crypto-security application 380 of the detection system 300. As shown in block 660, the quantum optimizer 200 modifies a quantum crypto-algorithm based on the first set of data and the type of the unauthorized attempt to generate a second key based on the first set of data and a second level of encryption using the second key. The quantum crypto-algorithm is any algorithm used by a quantum optimizer for generating a stronger non-linear key to create a stronger level of encryption. In some embodiments, the quantum crypto-algorithm is capable of generating a stronger linear key. For example, the quantum crypto-algorithm is capable of generating linear keys with higher bit size. In some embodiments, the quantum crypto-algorithm may be a combination of modified existing crypto-algorithms. The second level of encryption is higher than the first level of encryption as the key generated by the quantum optimizer 200 is stronger than a first key used in the first level of encryption. In some embodiments, generating a stronger key implies increasing the bit size of the key. For example, the first key used in the first level of encryption may be 128 bit key and the second key generated for creating the second level of encryption stronger than the first level of encryption may be a 256 bit non-linear key. The quantum optimizer 200 is capable of generating higher bit keys very quickly than a classical computer. In some embodiments, the quantum optimizer 200 is capable of generating polymorphic keys. For example, the bit size of the key and the type of the key are not constant. In one instance, the quantum optimizer 200 may generate a 4096 bit linear key. In another instance, the quantum optimizer 200 may generate a 1024 bit non-linear key. In some embodiments, higher level of encryption implies having a stronger firewall. In some embodiments, the first set of data may include data associated with the first level of encryption. For example, the first set of data may include the bit size of the first key. In some embodiments, the first set of data may include first level encrypted data. For example, the first set of data may include the already encrypted information generated using the first key. In some embodiments, the quantum computer analyzes the data associated with the first level of encryption and creates the second level of encryption, wherein the second level of encryption is more robust than the first level of encryption. For example, the quantum optimizer analyzes that the first level of encryption was generated using a 1024 bit key and modifies the quantum crypto-algorithm to generate a 8192 bit key. In some embodiments, the quantum optimizer 200 applies the second key to the first level encrypted data to generate the second level encrypted data. For example, the classical computer encrypts the information using the first key and generates the first level encrypted data, the quantum computer encrypts the first level encrypted data using the second key which forms a second layer. In some embodiments, the quantum optimizer 200 applies the second key to the information itself and generates the second level of information. For example, the quantum optimizer applies the second key to customer information to generate the second level of encryption which is higher than the first level of encryption. In some embodiments, the quantum optimizer 200 extracts the information from the classical computer that requires encryption based on the location address. This information may be stored in the entity system 400, other entity system systems 401, or the detection system 300. In such an embodiment, the quantum optimizer 200 generates the second level of encryption using the second key and transmits the encrypted information to the location address.

As shown in block 670, the quantum optimizer 200 transfers the second level of encryption and a new protocol to the crypto-security application 380. For example, the quantum optimizer encrypts the information using the second key and transfers the encrypted information to the crypto-security application 380. In some embodiments, the quantum optimizer 200 may create a new protocol for transferring encrypted information over the network, wherein the new protocol may allow only the levels of encryption generated by the quantum optimizer 200. In such an embodiment, the quantum optimizer 200 may transfer the new protocol to the crypto-security application 380. The crypto-security application 380 upon receiving the new protocol from the quantum optimizer 200, updates the existing firewall to include the new protocol for transferring the encrypted information over the network. For example, the crypto-security application 380 updates all the firewalls of entity systems to include the new protocol for transferring encrypted information. The new protocol enhances the existing firewall to make it stronger and is not known to the unidentified source. In some embodiments, the quantum optimizer 200 may interact with multiple entity systems (400 and 401) and the detection system 300 to directly update the existing firewalls with the new protocol. The existing firewall may allow only those sources or systems to access the encrypted information that include the new protocol. In some embodiments, the quantum optimizer 200 may use already existing protocols for transferring the encrypted information over the network. The existing protocols may include Teletype Network (Telnet), Secure Shell (SSH), File Transfer Protocol (FTP), Secure Shell File Transfer Protocol (SFTP), and/or the like. In such an embodiment, the quantum optimizer 200 encrypts the existing protocols and transfers the encrypted existing protocols to the crypto-security application 380 along with the second level of encryption. In some embodiments, the quantum optimizer may automatically change the location address of the information based on detecting the unauthorized attempt. For example, a set of information is stored in location "A", the quantum optimizer changes the location of the set of information to location "B" upon detecting the unauthorized attempt. In some embodiments, the location address may be a channel identification number of a channel used for transferring the information over the network. In such an embodiment, the quantum optimizer 200 may change the channel used for transferring the information over the network. In some embodiments, the quantum optimizer 200 may transmit a new location address to the crypto-security application 380, wherein the crypto-security application 380 moves the information from the previous location address to the new location address.

As shown in block 680, the system 300 receives the second level of encryption and the new protocol from the quantum optimizer 200 and monitors the unauthorized attempt to identify an event associated with the unauthorized attempt as shown in block 690. In some embodiments, the system 300 monitors the unauthorized attempt to detect continuing unauthorized attempts after a defined amount of time. For example, wherein the unauthorized attempt is a brute-force attack, the system 300 detects that the unidentified source is still attempting to try guess the key and the protocol after a defined amount time. In such an embodiment, the system 300 updates the first set of data and transmits the updated first set of data to the quantum optimizer 200. The quantum optimizer 200 receives the updated first set of data and creates a new second key and a new second level of encryption using the new second key. In one embodiment, the quantum optimizer 200 creates the new second key and applies it to the already encrypted information as a layer. In another embodiment, the quantum optimizer 200 creates the new second key and applies it to the information directly, wherein the second level of encryption is replaced by the new second level of encryption. In some embodiments, the quantum optimizer 200 modifies the second key and creates a modified second level of encryption. For example, the quantum optimizer modifies the second key using key stretching.

In one exemplary embodiment, the crypto-security application 380 in the detection system 300 identifies an unauthorized attempt to access a set of information that is being transferred from entity system 1 to entity system 2 over a channel "A" in the network 150, the crypto-security application 380 collects a set of data associated with the unauthorized attempt and transfers the set of data to the quantum optimizer, wherein the set of data includes type of encryption associated with the set of information, the channel identification number (channel "A"), the type of the set of information (user data, financial data, and/or the like), the protocol used in transferring the set of information (FTP, SFTP, and/or the like), and/or the like. The set of information is typically transferred in one or more packets and when the application 380 identifies the unauthorized attempt, the unidentified source is trying to access a first packet of the one or more packets associated with the set of information. The application 380 transfers the collected set of data and the set of information in the one or more packets that are yet to be transferred (except the first packet) to the quantum optimizer. The quantum optimizer 200 receives the set of data and based on analyzing the set of data, creates a new key and encrypts the set of information in the one or more packets using the new key, which is stronger than the previous encryption. The quantum optimizer 200 may also change the location from channel "A" to Channel "B" and may generate a new protocol. The quantum optimizer 200 transfers the encrypted set of information, the new location, the new protocol to the crypto-security application 380. The crypto-security application 380, upon receiving the encrypted set of information, the new location, the new protocol, transfers the encrypted set of information in one or more packets over channel "B" using the new protocol.

FIG. 7 presents a high level process flow 700 for generating an enhanced polymorphic quantum enabled firewall upon identifying an event. As shown in block 705, the system 300 identifies the event based on monitoring the unauthorized event, wherein the event is an information breach. Information breach may comprise identification of key and the protocol by the unidentified source and loss of information to the unidentified source. As shown in block 710, the system 300 collecting a second set of data associated with the event in response to identifying the event. The second set of data may include internet protocol address of the unidentified source, time period between identification of the unauthorized attempt and identification of the information breach, and/or the like. As shown in block 715, the system 300 transmits the second set of data associated with the event to the quantum optimizer 200.

As shown in block 720, the quantum optimizer 200 receives the second set of data associated with the event from the crypto-security application 380. As shown in block 725, the quantum optimizer 200 modifies the quantum crypto-algorithm based on the second set of data to generate a third key and a third level of encryption using the third key. The third key and the third level of encryption are stronger than any previously existing keys and levels of encryption. The quantum optimizer 200 may generate a second new protocol for transferring the encrypted information over the network.

As shown in block 730, the quantum optimizer 200 transfers the third level of encryption to the crypto-security application 380. In some embodiments, the quantum optimizer 200 transfers the new second protocol along with the third level of encryption. In some other embodiments, the quantum optimizer 200 encrypts the existing protocols and transfers the encrypted existing protocols along with the third level of encryption. As shown in block 735, the system 300 receives the third level of encryption from the quantum optimizer 200. The third level of encryption replaces all previously existing levels of encryption. For example, if the second key has been identified by the unidentified source, then the information encrypted using the second key will be decrypted and encrypted again using the third key. The process flow described in FIG. 6 is applied to this third level of encryption and is implemented upon identified a second unauthorized attempt.

In accordance with the present systems and methods, a quantum optimizer may be adapted for integration into detection system. The quantum optimizer may be configured for continuous operation, or it may be configured to be called upon/activated only when necessary to solve a specific problem (e.g., an optimization problem) that the quantum optimizer is particularly well-suited to solve. The quantum optimizer may, for example, be configured as a disposable, single-shot system (i.e., a system having a short lifespan or active time) for performing a single or small number of computations (if identified as necessary by the detection system) that govern a behavior of the detection system. Configuring the quantum optimizer as a disposable, single-shot system has the advantage of relaxing a number of design specifications that are otherwise necessary to provide the continuous, long-term operation typically expected in the known quantum computing arts. In accordance with the present systems and methods, the quantum optimizer may be configured to receive data from the detection system and perform a quantum computing operation in real-time.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer system for generating a polymorphic quantum enabled firewall in real-time, comprising:
a classical computer apparatus comprising:

15 a processor;
a memory; and
a crypto-security application that is stored in the memory and executable by the processor;
a quantum optimizer in communication with the classical computer apparatus, the quantum optimizer comprising:
a quantum processor; and
a quantum memory;
wherein the crypto-security application is configured for:
identifying an unauthorized attempt to access information by an unidentified source;
collecting a first set of data about the unauthorized attempt in response to identifying the unauthorized attempt to access the information;
determining a type of the unauthorized attempt by analyzing the first set of data, wherein the type of the unauthorized attempt is based on a level of severity of the unauthorized attempt;
transmitting the first set of data and the type of the unauthorized attempt to the quantum optimizer;
receiving from the quantum optimizer a second level of encryption and a new protocol; and
monitoring the unauthorized attempt to detect an event associated with the unauthorized attempt;
wherein the quantum optimizer is configured for:
receiving the first set of data and the type of the unauthorized attempt from the crypto-security application;
modifying a quantum crypto-algorithm to:
generate a second key based on the first set of data and the type of the unauthorized attempt;
generate the second level of encryption using the second key, wherein the second level of encryption is more robust than a first level of encryption; and
generate the new protocol for transferring the second level of encryption over a network;
transferring the second level of encryption and the new protocol to the crypto-security application.

2. The system of claim 1, wherein the unauthorized attempt is an attempt to bypass the first level of encryption.

3. The system of claim 1, wherein the crypto-security application is configured for:
identifying the event based on monitoring the unauthorized attempt, wherein the event is an information breach;
collecting a second set of data associated with the event in response to identifying the event; and
transmitting the second set of data associated with the event to the quantum optimizer;
receiving a third level of encryption from the quantum optimizer.

4. The system of claim 3, wherein the quantum optimizer is configured for:
receiving the second set of data associated with the event from the crypto-security application;
modifying the quantum crypto-algorithm to:
generate a third key based on the second set of data;
generate the third level of encryption using the third key; and
transferring the third level of encryption to the crypto-security application.

5. The system of claim 1, wherein the crypto-security application is configured for:
monitoring the unauthorized attempt to detect continuing unauthorized attempt by the unidentified source after a defined amount of time;

16 updating the first set of data and transmit the first set of data to the quantum optimizer; and
receiving the new second level of encryption from the quantum optimizer.

6. The system of claim 5, wherein the quantum optimizer is configured for:
generating a new second key based on receiving the updated first set of data from the crypto-security application;
generating a new second level of encryption using the new second key, wherein the new second level of encryption replaces the second level of encryption; and
transmitting the new second level of encryption to the crypto-security application.

7. The system of claim 6, wherein the quantum optimizer is configured for generating the new second key by modifying the second key.

8. A computer program product for generating a polymorphic quantum enabled firewall in real-time, comprising a non-transitory computer-readable storage medium having computer-executable instructions for causing a classical computer apparatus to:
identify an unauthorized attempt to access information by an unidentified source;
collect a first set of data about the unauthorized attempt in response to identifying the unauthorized attempt to access the information;
determine a type of the unauthorized attempt by analyzing the first set of data, wherein the type of the unauthorized attempt is based on a level of severity of the unauthorized attempt;
transmit the first set of data and the type of the unauthorized attempt to a quantum optimizer;
receive from the quantum optimizer a second level of encryption and a new protocol; and
monitor the unauthorized attempt to detect an event associated with the unauthorized attempt;
wherein the quantum optimizer is configured for:
receive the first set of data and the type of the unauthorized attempt from the classical computer apparatus;
modify a quantum crypto-algorithm to:
generate a second key based on the first set of data and the type of the unauthorized attempt;
generate the second level of encryption using the second key, wherein the second level of encryption is more robust than a first level of encryption; and
generate the new protocol for transferring the second level of encryption over a network;
transfer the second level of encryption and the new protocol to the classical computer apparatus.

9. The computer program product of claim 8, wherein the computer executable instructions cause the classical computer apparatus to:
identify the event based on monitoring the unauthorized attempt, wherein the event is an information breach;
collect a second set of data associated with the event in response to identifying the event; and
transmit the second set of data associated with the event to the quantum optimizer;
receive a third level of encryption from the quantum optimizer.

10. The computer program product of claim 9, wherein the computer executable instructions cause the quantum optimizer to:
receive the second set of data associated with the event from the classical computer apparatus;
modify the quantum crypto-algorithm to:

generate a third key based on the second set of data;
generate the third level of encryption using the third key; and
transfer the third level of encryption to the classical computer apparatus.

11. The computer program product of claim 8, wherein the computer executable instructions cause the classical computer apparatus to:
monitor the unauthorized attempt to detect continuing unauthorized attempt by the unidentified source after a defined amount of time;
update the first set of data and transmit the first set of data to the quantum optimizer; and
receive the new second level of encryption from the quantum optimizer.

12. The computer program product of claim 11, wherein the computer executable instructions cause the quantum optimizer to:
generate a new second key based on receiving the updated first set of data from the classical computer apparatus;
generate a new second level of encryption using the new second key, wherein the new second level of encryption replaces the second level of encryption; and
transmit the new second level of encryption to the classical computer apparatus.

13. The computer program product of claim 12, wherein the computer executable instructions cause the quantum optimizer to generate the new second key by modifying the second key.

14. A method for generating a polymorphic quantum enabled firewall in real-time, comprising:
identifying, via a classical computer apparatus, an unauthorized attempt to access information by an unidentified source;
collecting, via the classical computer apparatus, a first set of data about the unauthorized attempt in response to identifying the unauthorized attempt to access the information;
determining, via the classical computer apparatus, a type of the unauthorized attempt by analyzing the first set of data, wherein the type of the unauthorized attempt is based on a level of severity of the unauthorized attempt;
transmitting, via the classical computer apparatus, the first set of data and the type of the unauthorized attempt to a quantum optimizer;
receiving, via the quantum optimizer, the first set of data and the type of the unauthorized attempt from the classical computer apparatus;
modifying, via the quantum optimizer, a quantum crypto-algorithm to:
generate a second key based on the first set of data and the type of the unauthorized attempt;
generate the second level of encryption using the second key, wherein the second level of encryption is more robust than a first level of encryption; and
generating, via the quantum optimizer, a new protocol for transferring the second level of encryption over a network;
transferring, via the quantum optimizer, the second level of encryption and the new protocol to the classical computer apparatus;
receiving, via the classical computer apparatus, a second level of encryption and the new protocol from the quantum optimizer; and
monitoring, via the classical computer apparatus, the unauthorized attempt to detect an event associated with the unauthorized attempt.

15. The method of claim 14, wherein the unauthorized attempt is an attempt to bypass the first level of encryption.

16. The method of claim 14, wherein the method further comprises:
identifying, via the classical computer apparatus, the event based on monitoring the unauthorized attempt, wherein the event is an information breach;
collecting, via the classical computer apparatus, a second set of data associated with the event in response to identifying the event; and
transmitting, via the classical computer apparatus, the second set of data associated with the event to the quantum optimizer;
receiving, via the classical computer apparatus, a third level of encryption from the quantum optimizer.

17. The method of claim 16, wherein the method further comprises:
receiving, via the quantum optimizer, the second set of data associated with the event from the classical computer apparatus;
modifying, via the quantum optimizer, the quantum crypto-algorithm to:
generate a third key based on the second set of data;
generate the third level of encryption using the third key; and
transferring, via the quantum optimizer, the third level of encryption to the classical computer apparatus.

18. The method of claim 14, wherein the method further comprises:
monitoring, via the classical computer apparatus, the unauthorized attempt to detect continuing unauthorized attempt by the unidentified source after a defined amount of time;
update, via the classical computer apparatus, the first set of data and transmit the first set of data to the quantum optimizer; and
receive, via the classical computer apparatus, the new second level of encryption from the quantum optimizer.

19. The method of claim 18, wherein the method further comprises:
generating, via the quantum optimizer, a new second key based on receiving the updated first set of data from the classical computer apparatus;
generating, via the quantum optimizer, a new second level of encryption using the new second key, wherein the new second level of encryption replaces the second level of encryption; and
transmitting, via the quantum optimizer, the new second level of encryption to the classical computer apparatus.

20. The method of claim 19, wherein the new second key is generated, via the quantum optimizer, by modifying the second key.

* * * * *